US006955515B2

United States Patent
Barina et al.

(10) Patent No.: US 6,955,515 B2
(45) Date of Patent: Oct. 18, 2005

(54) LOCKING TURN PIN

(75) Inventors: Richard Barina, Wellington, FL (US); Dean F. Herring, Youngsville, NC (US); Glenn E. Myrto, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 2 days.

(21) Appl. No.: 10/731,052

(22) Filed: Dec. 9, 2003

(65) Prior Publication Data
US 2005/0123379 A1 Jun. 9, 2005

(51) Int. Cl.[7] ............................................... F16B 19/00
(52) U.S. Cl. ...................... 411/508; 411/509; 411/510
(58) Field of Search .................. 411/549, 13, 508–510, 411/71–74, 349

(56) References Cited

U.S. PATENT DOCUMENTS

| | | | | |
|---|---|---|---|---|
| RE16,062 E | * | 5/1925 | Tomkinson | 411/23 |
| 2,233,242 A | * | 2/1941 | Burke | 411/181 |
| 2,571,641 A | * | 10/1951 | Wing | 411/141 |
| 2,749,789 A | * | 6/1956 | Sam | 411/357 |
| 3,171,182 A | * | 3/1965 | Danehy | 411/552 |
| 3,220,078 A | * | 11/1965 | Peziosi | 411/349 |
| 3,272,061 A | * | 9/1966 | Seckerson | 411/15 |
| 3,849,839 A | * | 11/1974 | Zimber | 24/109 |
| 3,918,130 A | * | 11/1975 | Poe | 24/453 |
| 3,964,364 A | * | 6/1976 | Poe | 411/43 |
| 4,007,516 A | * | 2/1977 | Coules | 411/349 |
| 4,262,394 A | * | 4/1981 | Wright | 411/548 |
| 4,285,103 A | * | 8/1981 | Inamoto | 411/508 |
| 4,391,461 A | * | 7/1983 | Deibele | 292/204 |
| 4,571,134 A | * | 2/1986 | Beglinger et al. | 411/41 |
| 4,647,262 A | * | 3/1987 | Yokota | 411/44 |
| 4,762,437 A | * | 8/1988 | Mitomi | 403/11 |
| 4,956,900 A | * | 9/1990 | Mair | 24/606 |
| 5,083,926 A | * | 1/1992 | Kissinger et al. | 439/78 |
| 5,368,427 A | * | 11/1994 | Pfaffinger | 411/553 |
| 5,586,364 A | * | 12/1996 | Ferrari et al. | 16/383 |
| 5,620,291 A | * | 4/1997 | Hayes et al. | 411/552 |
| 5,718,549 A | * | 2/1998 | Noda et al. | 411/553 |
| 6,045,309 A | * | 4/2000 | LeVey | 411/45 |
| 6,206,606 B1 | * | 3/2001 | Mita et al. | 403/320 |
| 6,209,178 B1 | * | 4/2001 | Wiese et al. | 24/458 |
| 6,394,724 B1 | * | 5/2002 | Kelly et al. | 411/353 |
| 6,435,790 B1 | * | 8/2002 | Ichikawa | 411/349 |
| 6,474,921 B1 | * | 11/2002 | Gordon | 411/508 |
| 6,676,324 B1 | * | 1/2004 | Pleiss | 403/33 |
| 6,679,646 B2 | * | 1/2004 | Quardt et al. | 403/348 |
| 2002/0021950 A1 | * | 2/2002 | Ichikawa | 411/349 |

* cited by examiner

Primary Examiner—Robert J. Sandy
Assistant Examiner—Jeffrey A. Sharp
(74) Attorney, Agent, or Firm—Martin J. McKinley; Dillon & Yudell LLP

(57) ABSTRACT

A hand tightened locking pin using a unique internal cam configuration to lock the pin assembly. The pin assembly includes a sleeve and a locking cam unit. The sleeve includes anti-rotation protrusions that match a keyhole in a first metal plate to prevent rotation of the sleeve. The pin assembly is inserted through the keyhole of the first metal plate and a circular hole in a second metal plate that lies on the first metal plate. When the locking cam unit, which is inside the sleeve, is rotated, a lower portion of the sleeve expands, locking the first and metal plates together. The cam is locked in position by concave shaped ends that mate over bulges in the lower portion of the sleeve. A locked/unlocked indicator on top of the pin assembly indicates when the concave shaped ends are mated with the bulges.

11 Claims, 7 Drawing Sheets

LOCKING TURN PIN

BACKGROUND OF THE INVENTION

1. Technical Field

This invention relates generally to fasteners, and in particular fasteners for connecting two metal plates. Still more particularly, the present invention relates to a locking pin having a cam that expands a lower portion of an outer shell to lock the two metal plates together.

2. Description of the Related Art

As with other mechanical, electrical and electromechanical devices, computers are made up of many components that need to be rigidly fastened together, in order to avoid the absurdity of a loose collection of parts lying in a pile. Components such as cases and frames are typically held together with welds, rivets and other permanent fasteners. Other components, particularly internal components, are held together with nonpermanent fasteners that permit the internal components to be removed and/or replaced.

Internal components such as processor boards, or board support structures, are typically mounted on racks inside the computer. Each rack has mounting flanges with a hole in each flange, as does a frame holding the processor board. To secure the processor board to the rack, a nonpermanent fastener is placed through the aligned holes in the mounting flange of the rack and the processor board, and then the nonpermanent fastener is tightened, thus holding the two flanges together. Examples of such nonpermanent fasteners are nuts and bolts, setscrews, and clips. A problem with nuts and bolts and setscrews is that they require tools to be fastened or removed. A problem with clips is that they are prone to loosen and/or fall out, and often are unable to provide a very tight connection.

Thus, there is a need for a nonpermanent fastener that can be used without any tools, to fasten parts, and particularly computer parts, together. The fastener should be able to provide a secure, tight and strong connection that does not loosen with vibration over time. Preferably, the fastener should provide a "locked" position when securing two components together, and an "unlocked" position to remove the fastener. To avoid potential electrical shorting problems caused by the fastener being accidentally dropped onto electrical components in the computer, the nonpermanent faster should be constructed of a material that is electrically non-conducting. The fastener should be color distinctive for both identification and location. The fastener should have a distinct marking visible to the user that indicates whether the fastener is in the locked or unlocked position. Finally, the fastener should provide a tactile and/or audible feedback indicating when the fastener is in the locked position.

SUMMARY OF THE INVENTION

As will be seen, the foregoing invention satisfies the foregoing needs and accomplishes additional objectives. Briefly described, the present invention provides a hand tightened locking pin using a unique internal cam configuration to lock the pin assembly.

The pin assembly includes a sleeve and a locking cam unit. The sleeve includes anti-rotation protrusions that match a keyhole in a first metal plate to prevent rotation of the sleeve. The pin assembly is inserted through the keyhole of the first metal plate and a circular hole in a second metal plate that lies on the first metal plate. When the locking cam unit, which is inside the sleeve, is rotated, a lower portion of the sleeve expands, locking the first and metal plates together. The cam is locked in position by concave shaped ends that mate over bulges in the lower portion of the sleeve. A locked/unlocked indicator on top of the pin assembly indicates when the concave shaped ends are mated with the bulges, thus locking the two metal plates together.

BRIEF DESCRIPTION OF THE DRAWINGS

The novel features believed characteristic of the invention are set forth in the appended claims. The invention itself, however, as well as the preferred modes of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
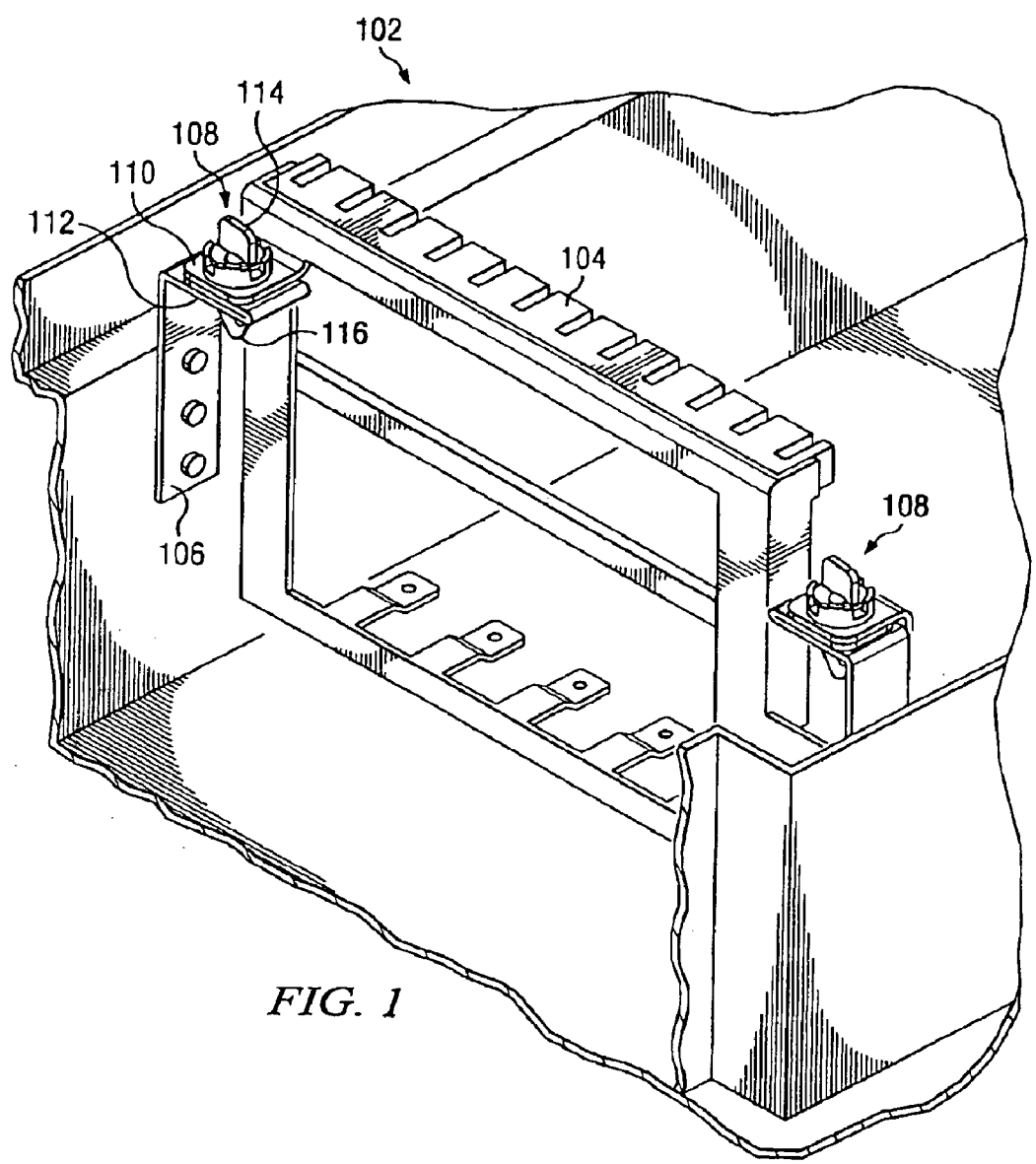
FIG. 1 depicts an interior or a computer housing.

Referring now to the drawing figures, in which like numerals indicate like elements or steps throughout the several views, the preferred embodiment of the present invention will be described. In general, the present invention provides an improved locking pin having an internal rotatable cam that expands a sleeve, thus locking two sheets of metal when the locking pin is inserted into holes in the sheets of metal and the internal rotatable cam is turned.

With reference now to FIG. 1, there is depicted an interior of a computer housing 102. Attached to the inside of computer housing 102 is a case mounted bracket 106. A processor board rack 104, designed to hold a processor board or support card/board (none shown), has a rack flange 110, which mates up with a bracket flange 112 of case mounted bracket 106. A feature of the present invention, a locking pin 108, couples rack flange 110 to bracket flange 112, thus attaching processor board rack 104 to case mounted bracket 106. As will be seen in further detail below, locking pin 108 includes a sleeve 116, in which a locking cam unit 114 is seated. As depicted in FIG. 1, locking pins 108 are in a locked position (which will be discussed in greater detail below), thus firmly coupling the processor board rack 104 to case mounted bracket 106.

Figure 2A:
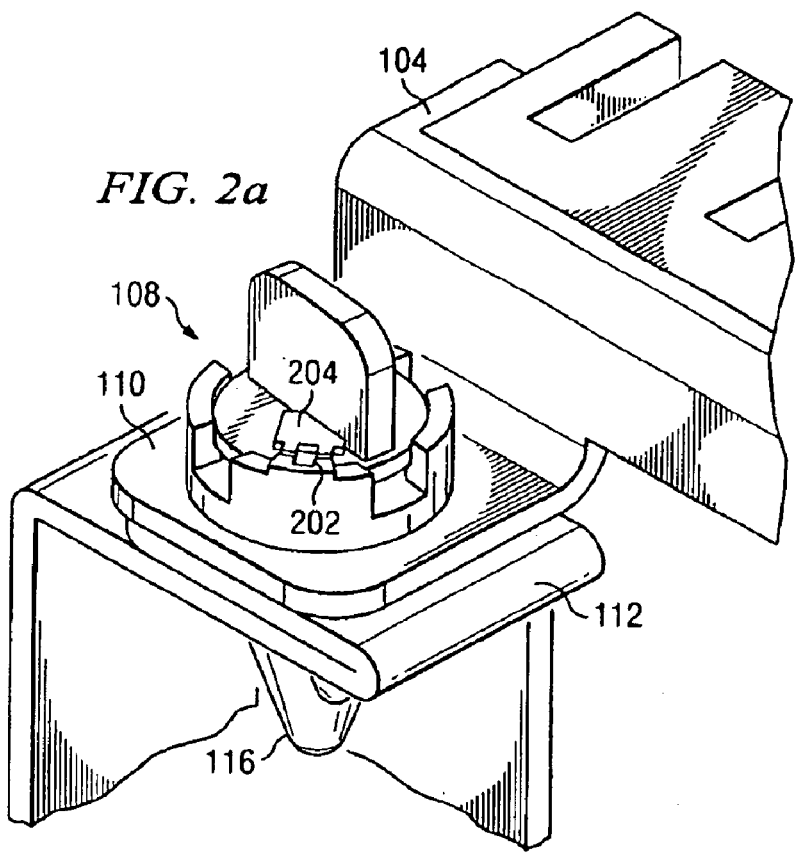
FIGS. 2a–b illustrate lock indicators on a locking pin.
Figure 2B:
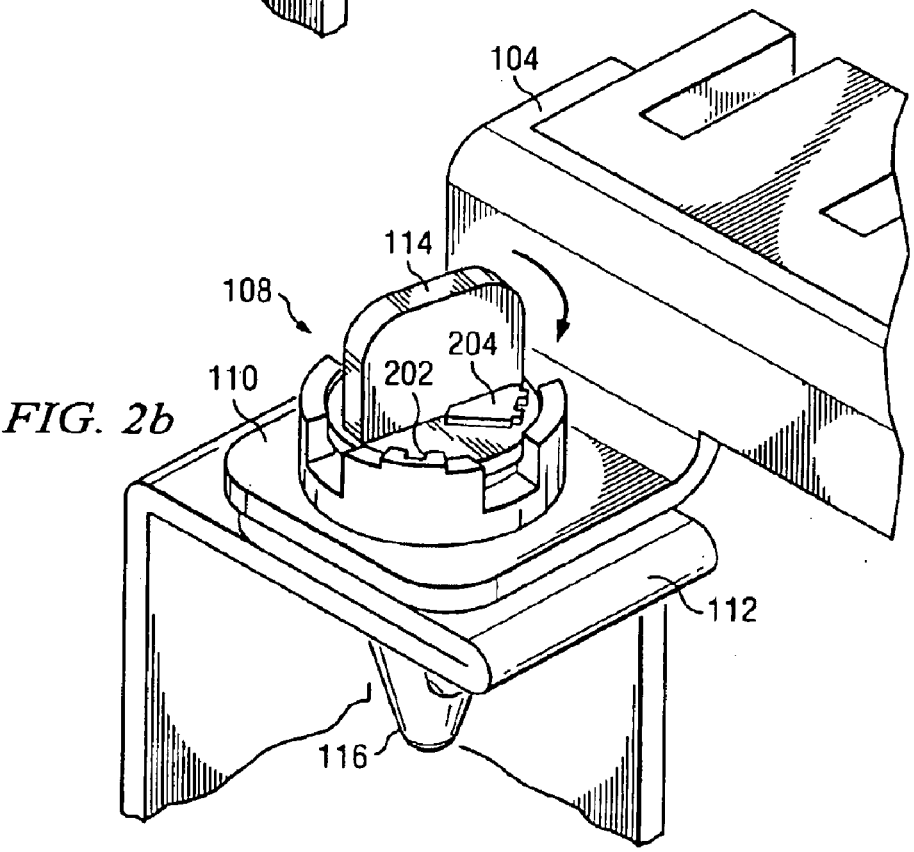

Referring now to FIG. 2a, additional detail of locking pin 108 is provided. As shown, locking pin 108 has a first locked indicator 202 and a second locked indicator 204. When locking pin 108 is in a locked position, about which more is described below, first locked indicator 202 and second locked indicator 204 align as shown. When locking pin 108 is in an unlocked position, by rotating locking cam unit as shown in FIG. 2b (either clockwise as shown or counter-clockwise depending on the design of locking pin 108 ), the first locked indicator 202 and second locked indicator 204 are no longer aligned. Accordingly, first locked indicator 202 and second locked indicator 204 provide a visual cue to a user indicating whether locking pin 108 is in a locked or unlocked position.

Figure 3A:
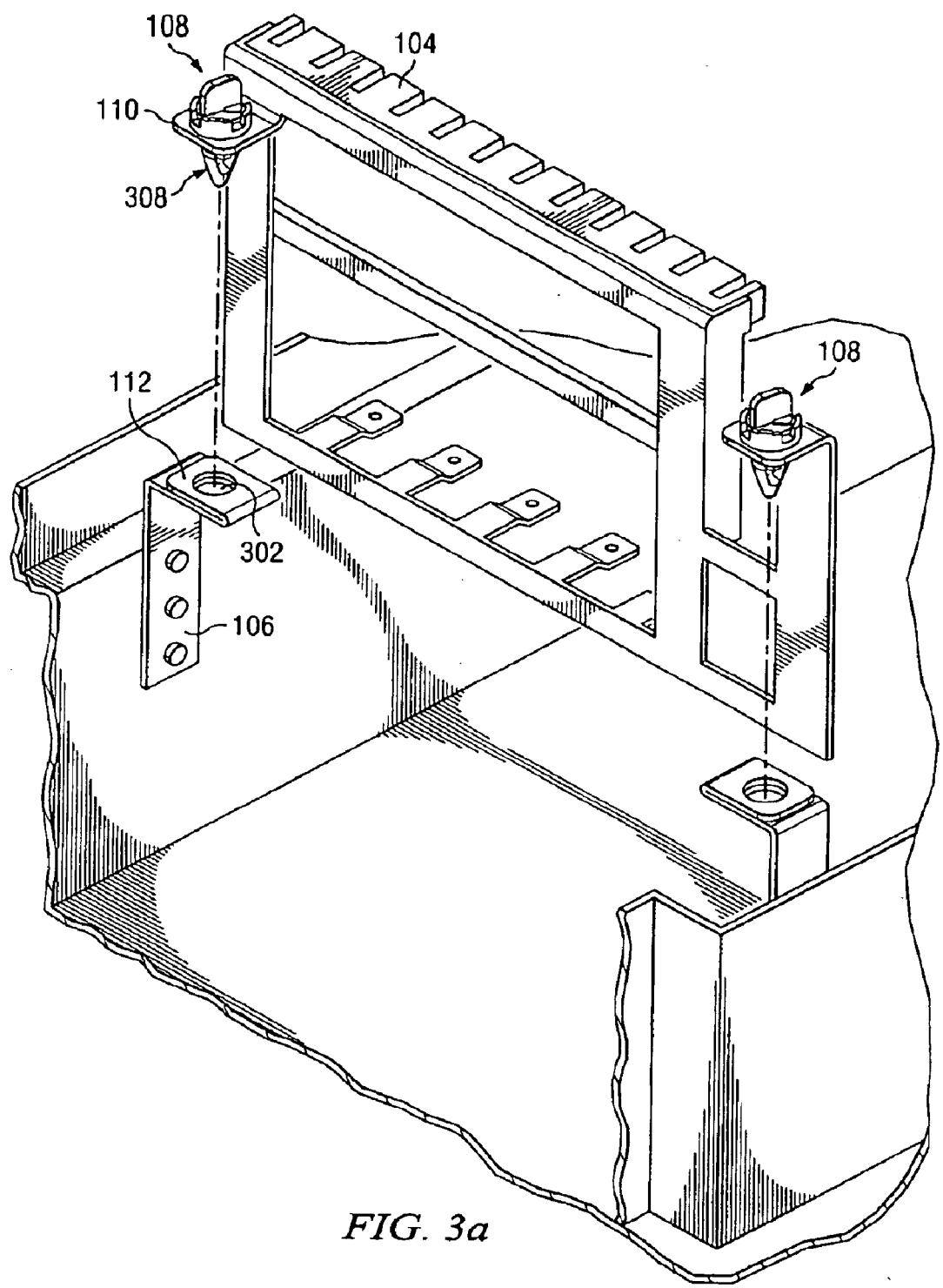
FIGS. 3a–c depict details of a processor board rack being connected to a case mounted bracket inside the computer housing.

With reference now to FIG. 3a, processor board rack 104 is shown being removed from case mounted bracket 106 when locking pins 108 are unlocked. Locking pins 108, and in particular expandable projections 308 are able to slide out of flange circular holes 302 when locking pins 108 are unlocked (allowing expandable projections 308 to be reduced in diameter, as described in further detail below).

Figure 3B:
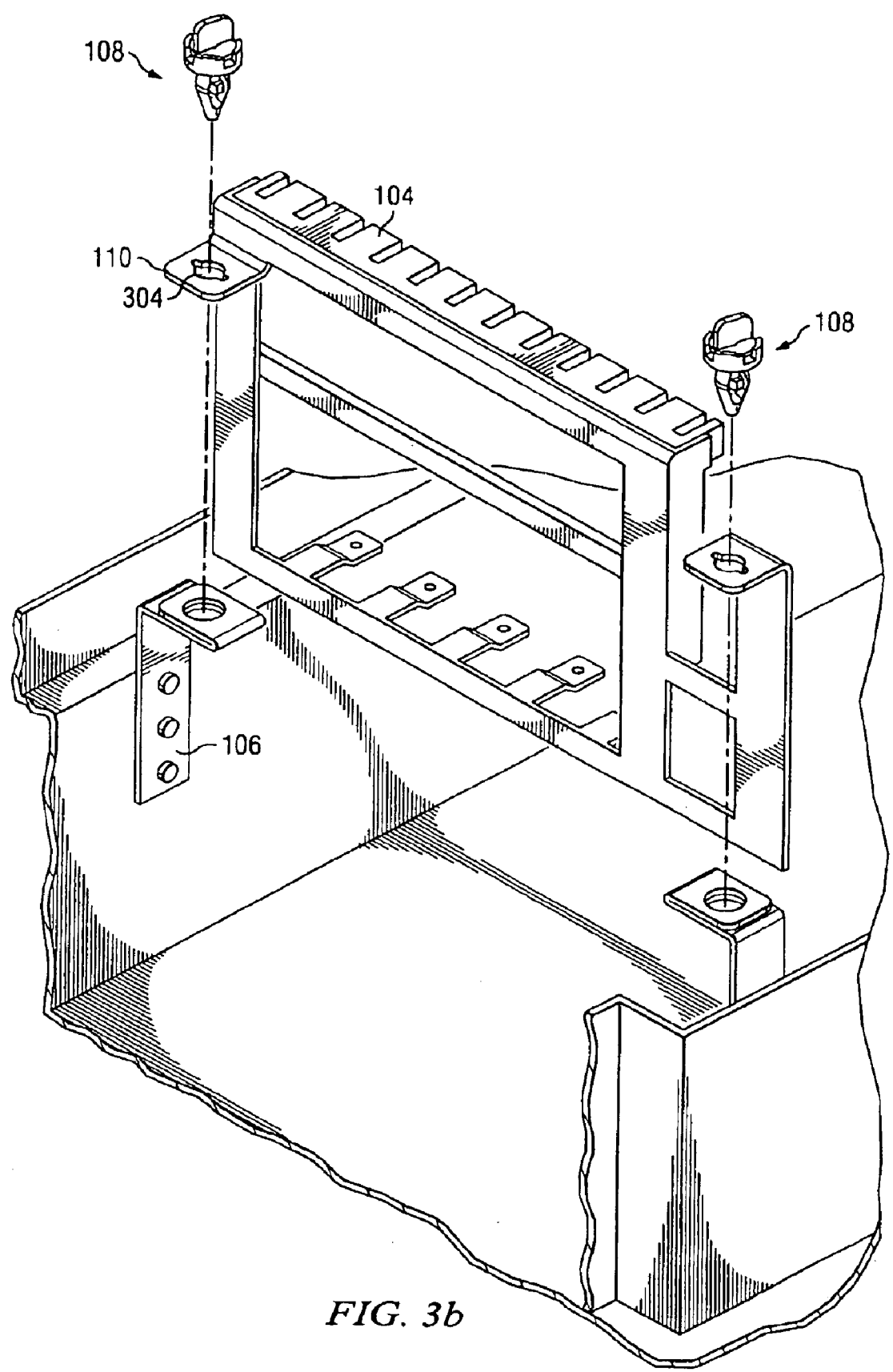

In FIG. 3b, a bracket keyed hole 304 is shown in rack flange 110. As shown, bracket keyed hole 304 is shaped to prevent a rotation of sleeve 116, for reasons described below. After processor board rack 104 is decoupled from case mounted bracket 106, the unlocked locking pins 108 can be slid out of rack flanges 110 as shown.

Figure 3D:
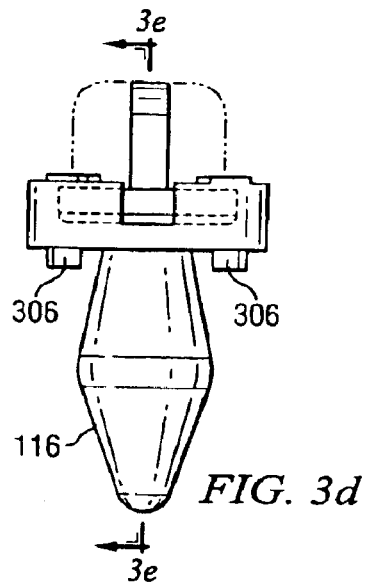
FIGS. 3d–e illustrate details of a sleeve component of the locking pin.
Figure 3C:
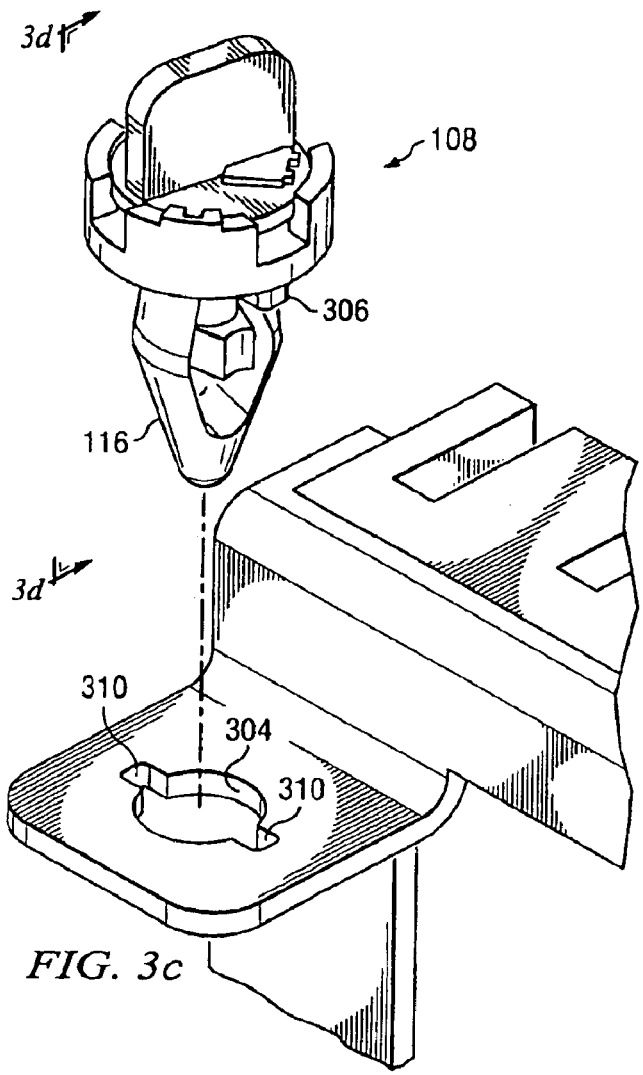

FIG. 3c provides additional detail of locking pin 108, an in particular sleeve 116. As illustrated in FIG. 3c and in a cross-sectional view in FIG. 3d, sleeve 116 has anti-rotation protrusions 306, which mate in keyed hole ends 310 to prevent a rotation of sleeve 116 when locking cam unit 114 is rotated to lock or unlock locking pin 108.

Figure 3E:
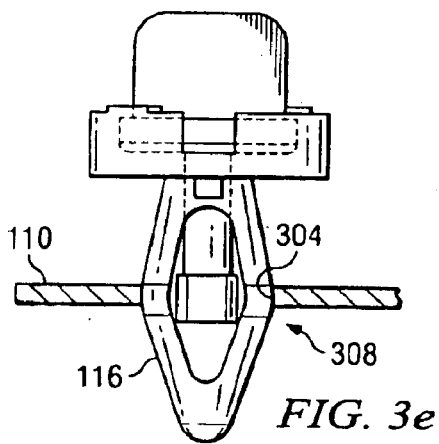

FIG. 3e provides additional detail of sleeve 116 as it is inserted or removed through bracketed keyed hole 304 of rack flange 110. As sleeve 116 is inserted or removed from rack flange 110, expandable projection 308 is compressed, allowing expandable projection 308 to slide through bracket keyed hole 304.

Figure 3F:
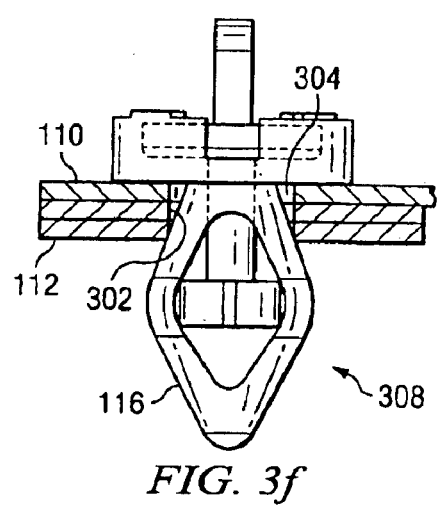

With reference now to FIG. 3f, when sleeve 116 is fully inserted through bracket keyed hole 304 and flange circular hole 302, expandable projection 308 expands, thus presenting a profile that is wider than flange circular hole 302 to lock sleeve 116 in, and to press rack flange 110 against bracket flange 112.

Figure 4A:
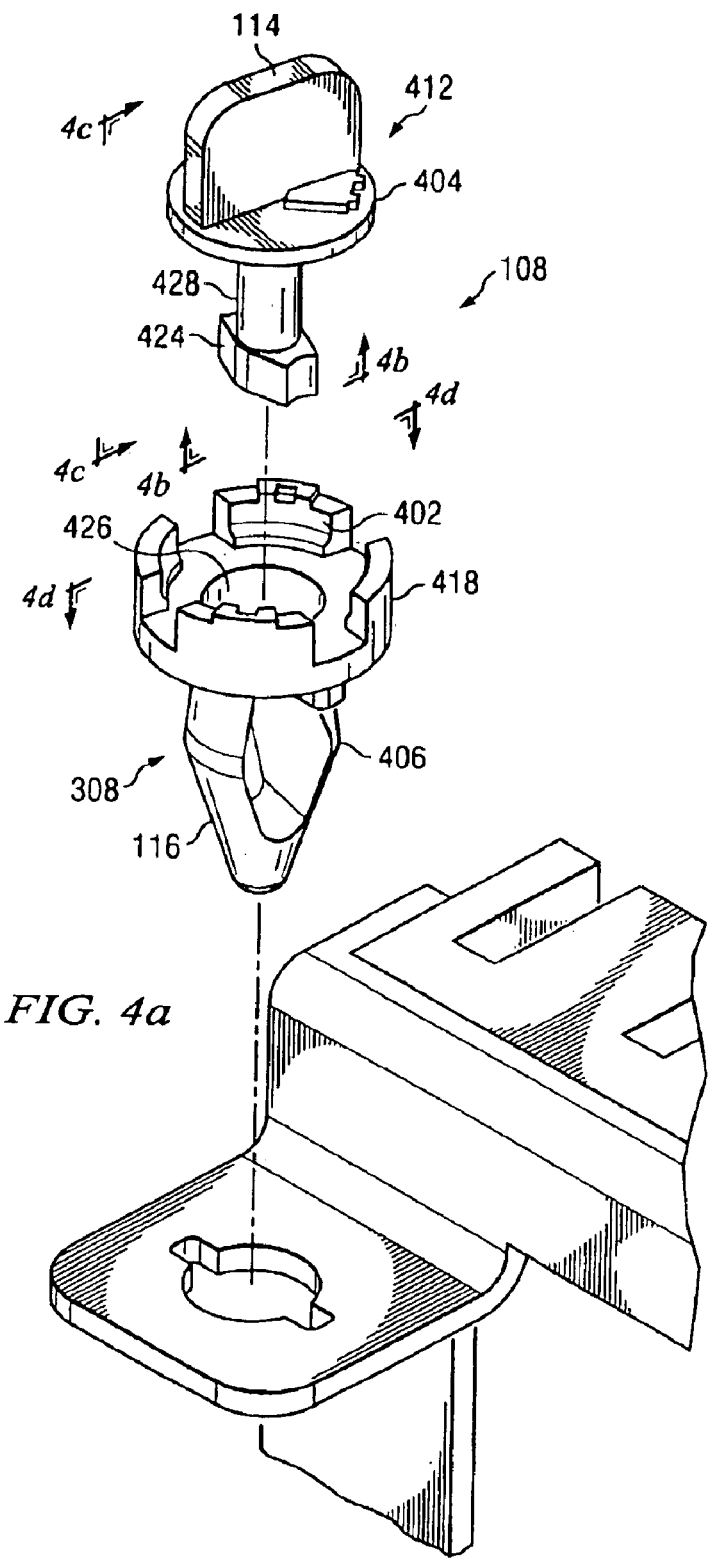
FIGS. 4a–b depict additional detail of the sleeve and a locking cam unit that make up the locking pin.

Referring now to FIG. 4a, an exploded view of locking pin 108, including locking cam unit 114 and sleeve 116. Note that in a preferred embodiment, sleeve 116 has a retention groove 402 inset into the interior face of a castled perimeter 418. When locking cam unit 114 is inserted into sleeve 116, a retention lip 404 on a cam unit disc 412 seats into retention groove 402, preventing locking cam unit 114 from coming out of sleeve 116 during normal use of locking pin 108.

A cam opening 426 passes through the center of sleeve 116, which affords a passageway for cam 424 and a cam stem 428 to pass through to the interior portion of expandable projection 308.

Figure 4B:
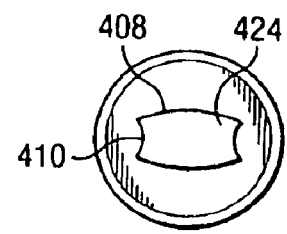

Note that cam 424 of locking cam unit 114 has an ellipse shape 408, as shown in FIG. 4b. Ellipse shape 408 is so shaped to lock the locking pin 108, as described further in FIGS. 5a–b. Note also that ellipse shape 408 has concave ends 410, which prevent locking pin 108 from unlocking, again as described in further detail below.

Figure 4C:
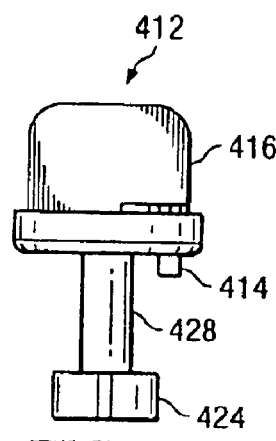
FIGS. 4c–d illustrate additional detail of a rotation limiting pin and channel in the locking pin.
Figure 4D:
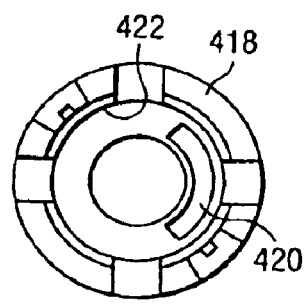

Referring to FIG. 4c, a side view of cam unit disc 412 is depicted, to give additional detail of a rotation-limiting pin 414. Rotation limiting pin 414 seats in a limiting channel 420, shown in FIG. 4d, which is inset in the mating side 422 of sleeve 116. As shown, limiting channel 420 preferably subtends 90° of arc, thus allowing locking cam unit 114 to rotate 90° to lock or unlock locking pin 108. Alternatively, rotation-limiting pin 414 can be attached to mating side 422 and limiting channel 420 can be inset into the underside of cam unit disc 412.

Figure 5A:
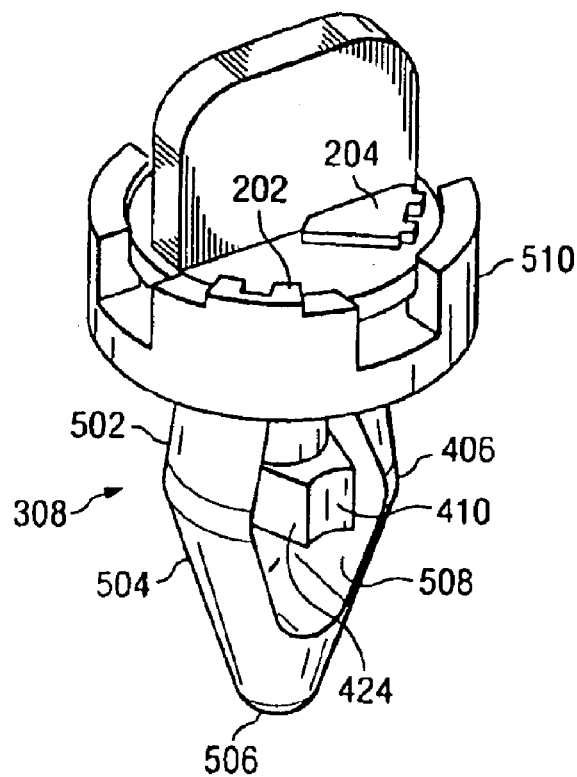
FIGS. 5a–b depict additional detail of the locking pin in an unlocked (FIG. 5a) and locked (FIG. 5b) position.

With reference now to FIG. 5a, locking pin 108 is illustrated in an unlocked position. As shown, in the unlocked position, cam 424 is oriented within an expandable opening 508 such that cam 424 does not press against expandable projection 308. That is, when locking pin 108 is in the unlocked position, cam 424 does not press against a cylindrical portion 502, a conical portion 504, or a bullet nose 506 of expandable projection 308. (Note that cylindrical portion 502 is preferably attached in a perpendicular orientation to a base 510 of sleeve 116.) As such, expandable projection 308 retains a relatively narrow diameter, and does not push against an underside surface of rack flange 110 shown in FIG. 1. Furthermore, in the non-expanded configuration, expandable projection 308 allows locking pin to be removed as described above in FIG. 3b. Note that first locked indicator 202 and second locked indicator 204 are not aligned, thus indicating the locking pin is in the unlocked condition.

Figure 5B:
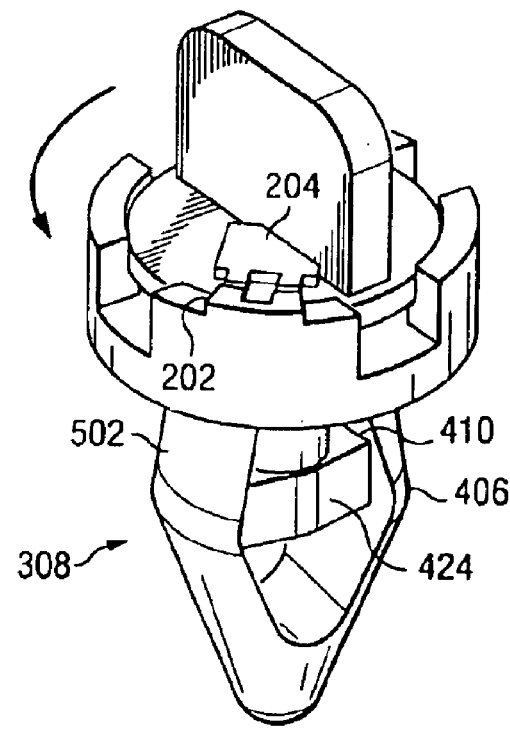

Referring now to FIG. 5b, locking pin 108 is depicted in a locked position. In the locked position, cam 424 presses against the interior surface of expandable projection 308, primarily against the area where cylindrical portion 502 and conical portion 504 meet. This pressure causes the diameter of expandable projection 308 to expand, causing the exterior surface of expandable projection 308 to press against the underside surface of rack flange 110 shown in FIG. 1, thus locking together the rack flange 110 and the bracket flange 112. Note also the alignment of first locked indicator 202 and second locked indicator 204 indicating the locked condition of locking pin 108.

Because of the configuration and fit of cam 424, and particularly concave end 410, against cam retaining bulge 406, a tactile "snap" feedback is produced with locking pin 108 locks into the locked position. This "snap" feeling transmitted to the user gives a tactile indication, which augments the visual indication afforded by first locked indicator 202 aligning with second locked indicator 204, that locking pin 108 is locked.

In a preferred embodiment, sleeve 116 is a first distinctive color, such as (but not exclusively) yellow, and locking cam unit 114 is a second distinctive color, such as (but not exclusively) blue. This distinctive color-coding provides two advantages. First, they allow the user to quickly spot where the locking pins 108 are located. Second, by being different colors, the user can clearly confirm that the sleeve 116 is not rotating when the locking cam unit 114 is being rotated during the locking or unlocking of locking pin 108.

The present invention has been described in relation to particular embodiments that are intended in all respects to be illustrative rather than restrictive. Alternative embodiments will become apparent to those skilled in the art to which the present invention pertains without departing from its spirit and scope. For example, although the inventive locking pin has been depicted as securing a processor board rack, the locking pin is also useful in directly securing (fastening) a board or any similar mechanical support structure. Likewise, although the present invention has been described in accordance with use in attaching components inside a computer, it will be appreciated that the locking pin may be useful in any scenario in which a tight locking mechanism is required without the use of tools. Accordingly, the scope of the present invention is defined by the appended claims rather than the foregoing discussion.

| FIGURE COMPONENT LISTING | |
|---|---|
| 102 | computer housing |
| 104 | processor board rack |
| 106 | case mounted bracket |
| 108 | locking pin |
| 110 | rack flange |
| 112 | bracket flange |
| 114 | locking cam unit |
| 116 | sleeve |
| 202 | first locked indicator |
| 204 | second locked indicator |
| 302 | flange circular hole |
| 304 | bracket keyed hole |
| 306 | anti-rotation protrusion |
| 308 | expandable projection |
| 310 | keyed hole ends |
| 402 | retention groove |
| 404 | retention lip |
| 406 | cam retaining bulge |
| 408 | ellipse shape |
| 410 | concave end |
| 412 | cam unit disc |
| 414 | rotation limiting pin |
| 416 | thumb grip |
| 418 | castled perimeter |
| 420 | limiting channel |
| 422 | mating side |
| 424 | cam |
| 426 | cam opening |
| 428 | cam stem |
| 502 | cylindrical portion |
| 504 | conical portion |
| 506 | bullet nose |
| 508 | expandable opening |
| 510 | base |

What is claimed is:

1. A locking pin comprising:

a sleeve, the sleeve having:

a base, the base having:

a mating side, the mating side having:

a castled perimeter, the castled perimeter having:

a retention groove in an interior surface of the castled perimeter, a first rotation limiting channel or pin, and a first locked indicator on a top surface of the castled perimeter, a projection side opposite the mating side, the projection side having:

an anti-rotation protrusion, wherein the anti-rotation protrusion is mated into a keyed opening in a first planar mount to prevent rotation of the sleeve, and a cam opening through a central portion of the base, an expandable projection coupled perpendicular to the projection side of the base, the expandable projection having:

a cylindrical portion coupled to the projection side of the base, a conical portion, the conical portion having a first end that is coupled to the cylindrical portion, an expandable opening traversing across the expandable projection to define an expandable projection interior surface, the expandable projection interior surface having:

a cam retaining bulge; and a bullet nose coupled to a second end of the conical portion; and a locking cam unit, the locking cam unit having:

a thumb grip, a cam unit disk coupled to the thumb grip, the cam unit disk having:

a first side coupled to the thumb grip, the first side having:

a second locked indicator, a retention lip, wherein the locking cam unit fits inside the cam opening of the sleeve, such that the retention lip mates into the retention groove to secure the locking cam unit inside the sleeve while allowing the locking cam unit to freely rotate, and a second side, the second side having:

a second rotation limiting channel or pin, wherein the first rotation limiting channel or pin and the second rotation limiting channel or pin mate a pin into a channel to limit a rotation of the cam unit disk, and a locking cam coupled to the cam unit disk, the locking cam having:

an elliptical shape having a width and two ends, and a concave indentation in each of the two ends, wherein the width of the elliptical shape is sufficient to press and lock against one of the concave indentations against the cam retaining bulge, thus causing the expandable projection to expand outward and to prevent the locking cam unit from rotating.

2. The locking pin of claim 1, wherein the locking cam provides a tactile feedback when the concave indention locks against the cam-retaining bulge.

3. The locking pin of claim 1, wherein if the locking pin is inserted through the first planar mount and a second planar mount and the first and second planar mounts are contiguous, the expandable projection expands to lock the first and second planar mounts together by forcing the expandable projection against the second planar mount and by forcing the projection side of the base of the sleeve against the first planar mount.

4. The locking pin of claim 1, wherein the first and second lock indicators are aligned when the concave indentation presses and locks against one of the concave indentations to lock the locking pin.

5. The locking pin of claim 1, wherein the sleeve is a first color and the locking cam unit is a second color, wherein the first and second colors are selected to provide a quick visual reference identifying the locking pin as a locking pin, and the different first and second colors providing a visual cue to a user of the sleeve remaining fixed while the locking cam unit is rotated.

6. The locking pin of claim 1, wherein the locking pin is composed of only material that is electrically non-conductive.

7. A locking pin comprising:

a sleeve, the sleeve having:

a base, the base having:

a mating side, the mating side having:

a castled perimeter, the castled perimeter having:

a retention groove in an interior surface of the castled perimeter, a first rotation limiting channel or pin, and a first locked indicator on a top surface of the castled perimeter, a projection side opposite the mating side, the projection side having:

an anti-rotation protrusion, wherein the anti-rotation protrusion is mated into a keyed opening in a first planar mount to prevent rotation of the sleeve, and a cam opening through a central portion of the base, an expandable projection coupled perpendicular to the projection side of the base, the expandable projection having:

a cylindrical portion coupled to the projection side of the base, a conical portion, the conical portion having a first end that is coupled to the cylindrical portion, an expandable opening traversing across the expandable projection to define an expandable projection interior surface, the expandable projection interior surface having:

a cam retaining bulge; and a bullet nose coupled to a second end of the conical portion; and a locking cam unit, the locking cam unit having:

a thumb grip, a cam unit disk coupled to the thumb grip, the cam unit disk having:

a first side coupled to the thumb grip, the first side having:

a second locked indicator, a retention lip, wherein the locking cam unit fits inside the cam opening of the sleeve, such that the retention lip mates into the retention groove to secure the locking cam unit inside the sleeve while allowing the locking cam unit to freely rotate, and a second side, the second side having:

a second rotation limiting channel or pin, wherein the first rotation limiting channel or pin and the second rotation limiting channel or pin mate a pin into a channel to limit a rotation of the cam unit disk, and a locking cam coupled to the cam unit disk, the locking cam having:

an elliptical shape having a width and two ends, and a concave indentation in each of the two ends, wherein the width of the elliptical shape is sufficient to press and lock against one of the concave indentations against the cam retaining bulge, thus causing the expandable projection to expand outward and to prevent the locking cam unit from rotating, wherein the sleeve is a first color and the locking cam unit is a second color, and wherein the first and second colors are selected to provide a quick visual reference identifying the locking pin as a locking pin, and the different first and second colors providing a visual cue to a user of the sleeve remaining fixed while the locking cam unit is rotated.

8. The locking pin of claim 7, wherein the locking cam provides a tactile feedback when the concave indention locks against the cam-retaining bulge.

9. The locking pin of claim 7, wherein if the locking pin is inserted through the first planar mount and a second planar mount and the first and second planar mounts are contiguous, the expandable projection expands to lock the first and second planar mounts together by forcing the expandable projection against the second planar mount and by forcing the projection side of the base of the sleeve against the first planar mount.

10. The locking pin of claim 7, wherein the first and second lock indicators are aligned when the concave indentation presses and locks against one of the concave indentations to lock the locking pin.

11. The locking pin of claim 7, wherein the locking pin is composed of only material that is electrically non-conductive.

* * * * *